United States Patent [19]

Horiki et al.

[11] Patent Number: 4,879,158

[45] Date of Patent: Nov. 7, 1989

[54] MASKING MEMBER

[75] Inventors: Seinosuke Horiki; Reiji Makino, both of Nagoya; Hisami Iwata, Aichi, all of Japan

[73] Assignees: Nagoya Oilchemical Co., Ltd.; Toyota Jidosha Kabushiki Kaisha, both of Aichi, Japan

[21] Appl. No.: 81,295

[22] Filed: Aug. 3, 1987

[30] Foreign Application Priority Data

Aug. 6, 1986 [JP] Japan .......................... 61-120518[U]

[51] Int. Cl.$^{4}$ ......................... B32B 1/00; B05C 21/00

[52] U.S. Cl. .................................. 428/159; 427/282; 118/504; 118/505

[58] Field of Search ................ 428/365; 427/282, 287, 427/430.1, 272, 96; 4/295; 138/89; 220/287, 307, DIG. 19; 128/864, 865, 866, 867, 868; 215/33, 34, 355, 363; 118/504, 505

[56] References Cited

U.S. PATENT DOCUMENTS

| | | | |
|---|---|---|---|
| 2,538,339 | 1/1951 | Thomas | 128/152 |
| 2,737,953 | 3/1956 | Wiltein | 128/151 X |
| 3,623,628 | 11/1970 | Rericha | 220/307 |
| 3,667,988 | 6/1972 | Horiki | 427/282 |
| 4,714,633 | 12/1987 | Horiki et al. | 427/282 |
| 4,764,421 | 8/1988 | Horiki et al. | 428/36.5 |

*Primary Examiner*—Henry J. Recla
*Assistant Examiner*—Glenn T. Barrett
*Attorney, Agent, or Firm*—Cooper & Dunham

[57] ABSTRACT

A new masking member consisting of an inserting part and a double flange formed at the base of said inserting part wherein the diameter of the outer part of said double flange is larger than the diameter of the inner part of said double flange is presented in the present invention. When said masking member is used, said inserting part of said masking member is inserted into a hole of an article and said double flange of said masking member covers the surroundings of said hole. Thus the inside of said hole and said surroundings of said hole are protected from a surface treatment and the removing of said masking member after said surface treatment from said hole may be very smooth without obstruction of the film of said surface treatment since said film may be cut by the edge of the outer part of said double flange.

2 Claims, 2 Drawing Sheets

MASKING MEMBER

BACKGROUND OF THE INVENTION

The present invention relates to a new masking member used to protect the inside and circumference of a hole such as a water outlet hole, a cable piercing hole, and the like from a surface treatment such as coating, plating, phosphatizing, vacuum evaportion and the like. More particularly, the present invention relates to a new masking member consisting of an inserting part and a double flange formed at the base of said inserting part wherein the diameter of the outer part of said double flange is larger than the diameter of the inner part of said double flange. In a case where a surface treatment is effected on the surface of an article, said surface of said article often has hole(s) whose inside must be protected from said surface treatment. Said hole(s) may be a water outlet hole, a cable piercing hole, and the like, and a grummet, a plug, a bolt and the like may be inserted into said hole(s).

DESCRIPTION OF THE PRIOR ART

Hitherto, a masking member of the plug type has been used to protect said hole from a surface treatment. Said masking member may be inserted into a hole of an article to be protected before said surface treatment and, when said surface treatment is effected on the surface of an article, said hole of said masking member is not subjected to said surface treatment. After said surface treatment, said masking member may be removed from said hole of said article. Nevertheless, the resulting film of said surface treatment covers continuously the surface of said article and the surface of said masking member enough to obstruct the smooth removing of said masking member from said hole of said article. Further, in a case where said surface treatment is a coating and said masking member has a taper form, said coating may collect on the surroundings of said hole, namely on the surroundings of said masking member to form a thick part of said coating film on said surroundings of said hole. Said thick part may obstruct a grummet, plug, bolt and the like from fitting tightly to said hole.

SUMMARY OF THE INVENTION

Accordingly, an object of the present invention is to save trouble when the masking member is removed from said hole(s) of an article, the inside of which is necessary to be protected from a surface treatment.

Further, the object of the present invention is to provide a tight fitting for a grummet, plug, bolt, and the like to said hole(s) of an article. According to the present invention, there is provided a masking member consisting of an inserting part and a double flange formed at the base of said inserting part wherein the diameter of the outer part of said double flange is larger than the diameter of the inner part of said double flange. When said masking member is used, said masking member is inserted into said hole of said article, the inside of which is necessary to be protected from a surface treatment, and said double flange of said masking member covers the surroundings of said hole and, as a result, the inside of said hole(s) is protected from a surface treatment and the film of said surface treatment is cut by the edge of the upper part of the double flange of said masking member. Thus is the present invention.

Said masking member may be removed from the hole of an article without the obstruction of the film of said surface treatment and a grummet, plug, bolt and the like may fit tightly to the hole of the article without looseness.

Said masking member may be made of plastics such as polystyrene, polyethylene, polypropylene and the like, or rubber such as styrene-butadiene rubber, acrylonitrile-butadiene rubber and the like, or a foam of said plastics or said rubber, and said masking member may be colored by (a) suitable color(s) if desired, for the purpose of selection of the specified masking member according to the hole into which it is to be inserted. A masking member made of polystyrene foam may be one of the most suitable masking members in the present invention.

DETAILED DESCRIPTION

Figure 1:
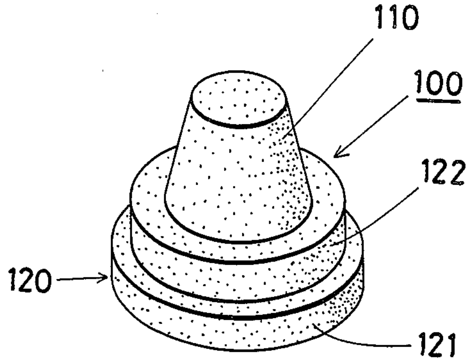
FIG. 1 is a perspective view of an embodiment of the present invention.

FIG. 1 to FIG. 4 relate to an embodiment of the present invention. Referring now to said figures, a masking member (100) consists of an inserting part (110) and a double flange (120) formed at the base of said inserting part (110) wherein the diameter of the outer part (121) of said double flange (120) is larger than the diameter of the inner part (122) of said double flange (120). Said inserting part (110) has a taper form decreasing in diameter from the base of said inserting part (110) to the top of said inserting part (110).

Figure 2:
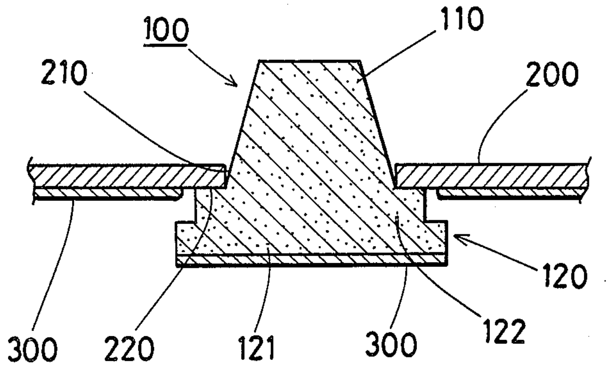
FIG. 2 is a partial side sectional view of the article including a hole after the surface treatment.
Figure 3:
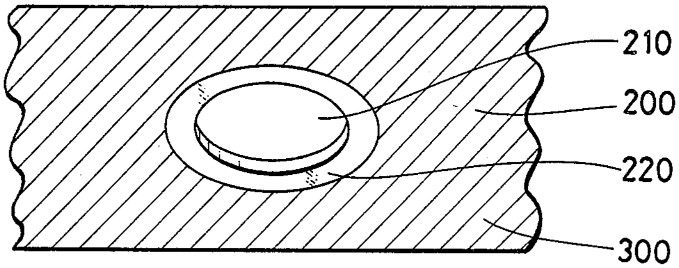
FIG. 3 is a partial perspective view of said article including said hole after the removal of said masking member.
Figure 4:
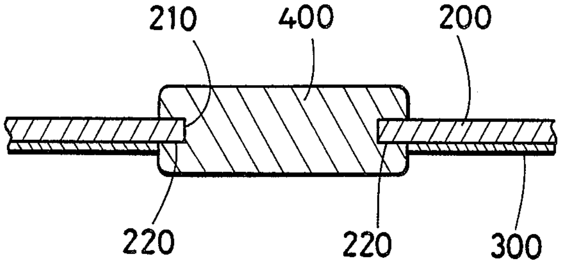
FIG. 4 is a partial side sectional view of the article including said hole into which a grummet has been inserted.

When said masking member (100) is used, said masking member (100) protects the inside of a hole (210) of an article (200) by inserting said inserting part (110) into said hole (210) as shown in FIG. 2, and the inner part (110) of said double flange (120) of said masking member (100) covers the surroundings (220) of said hole (210). After which, a surface treatment such as a coating is effected on the surface of said article (200) to form a film (300) of said surface treatment and the inside and surroundings of said hole (210) are not subjected to said surface treatment and, further, said film (300) of said surface treatment may be cut by the edge of the outer part (121) of said double flange (120) of said masking member (100) on said surroundings (220) of said hole (210). After said surface treatment, said masking member may be removed from said hole (210) by hand, hook, and the like. In a case where said masking member (100) is made of a thermoplastic foam, said masking member (100) can be removed from said hole (210) by heating at a temperature higher than the softening point of said thermoplastic foam. When said masking member (100) made of said thermoplastic foam is heated to a temperature higher than the softening point of said thermoplastic foam of said masking member it may be softened and gases such as air, gas of a blowing agent, and the like in the cells of said thermoplastic foam may first expand and so said masking member may also expand and, then, when said gases leave the cells, said masking member (100) may shrink rapidly and remove itself naturally from said hole (210). As beforementioned, said masking member (100) may be smoothly removed without the obstruction of said film (300) of said surface treatment since said film (300) is cut by the edge of the outer part (121) of said double flange (120) of said masking member (100) on said surroundings (220) of said hole (210). After said masking member (100) is removed from said hole (210), said film (300) has not been formed inside and on said surroundings (220) of said hole (210) as shown in FIG. 3 and a grummet (400) may be tightly inserted into said hole (210) without looseness as shown in FIG. 4, since there is no thick part of said film (300) of said surface treatment on said surroundings (220) of said hole (210). Further, said masking member (100) can be used for many holes having different diameters since said inserting part (110) of said masking member (100) has a taper form as before mentioned.

We claim:

1. A solid plug type masking member adapted for insertion into an opening to mask the opening and periphery thereof comprising a unitary structure providing a tapered solid plug portion and double flange end portion, the tapered solid plug portion having a relatively small end and a relatively large end, said tapered plug portion uniformly increasing in diameter from said small end to said large end, said double flange portion being fixed to said relatively large end and said tapered plug portion, the double flange end portion comprising a relatively small flange larger in diameter than the large end of said tapered plug portion on which said small flange is provided and a relatively large flange larger than and directly superposed on said small flange, said masking member being comprised of polystyrene foam, the outside dimension or periphery of said small flange when said masking member is inserted into said opening being larger than the opening into which said tapered plug portion is inserted.

2. A masking member in accordance with Claim 1 wherein said tapered plug portion comprises a truncated conical plug wherein said relatively small flange and said relatively large flange of said double flange portion are circular in horizontal cross-section than cylindrical in vertical cross-section.

* * * * *